(12) United States Patent
Kim et al.

(10) Patent No.: US 12,319,177 B2
(45) Date of Patent: Jun. 3, 2025

(54) RECLINER FOR VEHICLE SEAT

(71) Applicant: Hyundai Transys Inc., Seosan-si (KR)

(72) Inventors: Sungchul Kim, Hwaseong-si (KR); Kyu Ha Shin, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 197 days.

(21) Appl. No.: 18/325,487

(22) Filed: May 30, 2023

(65) Prior Publication Data
US 2024/0017648 A1    Jan. 18, 2024

(30) Foreign Application Priority Data
Jul. 15, 2022    (KR) .......................... 10-2022-0087697

(51) Int. Cl.
*B60N 2/22*    (2006.01)

(52) U.S. Cl.
CPC .................................... *B60N 2/224* (2013.01)

(58) Field of Classification Search
CPC .... B60N 2/224; B60N 2/2254; B60N 2/2252; B60N 2/22; B60N 2/225; B60N 2/2209; B60N 2/2213
USPC ......................................................... 297/364
See application file for complete search history.

(56) References Cited

U.S. PATENT DOCUMENTS

| | | | | |
|---|---|---|---|---|
| 4,082,352 A * | 4/1978 | Bales | ..................... | B60N 2/2358 297/367 R |
| 5,871,414 A * | 2/1999 | Voss | ..................... | B60N 2/2252 475/162 |
| 6,092,874 A * | 7/2000 | Kojima | ..................... | B60N 2/236 297/367 R |
| 6,474,740 B1 * | 11/2002 | Kondo | ..................... | B60N 2/236 297/367 R |
| 6,619,743 B1 * | 9/2003 | Scholz | ..................... | B60N 2/225 74/528 |
| 6,880,887 B2 * | 4/2005 | Hoshihara | ............... | B60N 2/236 297/367 R |
| 6,890,034 B2 * | 5/2005 | Bonk | ..................... | B60N 2/236 297/367 R |
| 6,910,738 B2 * | 6/2005 | Bonk | ..................... | B60N 2/236 297/367 R |
| 6,991,295 B2 * | 1/2006 | Peters | ..................... | B60N 2/236 297/367 R |

(Continued)

FOREIGN PATENT DOCUMENTS

| | | | | |
|---|---|---|---|---|
| CN | 109398172 A | * | 3/2019 | ................ B22F 3/02 |
| DE | 102019210891 A1 | | 1/2021 | |

(Continued)

OTHER PUBLICATIONS

Aurelien Petiaud, "European Etended Search Report for EP Application No. 23174273.5", Dec. 5, 2023, EPO, Germany.

*Primary Examiner* — James M Ference
(74) *Attorney, Agent, or Firm* — Bridgeway IP Law Group, PLLC; Jihun Kim (57) ABSTRACT

A recliner for a vehicle seat includes a first gear having a collar part extending from a center of one surface, a second gear configured to eccentrically engage with the first gear while being internally in contact with the first gear, a ring member coupled to surround the collar part, a socket coupled to surround the ring member, and a pair of wedge cams disposed between the ring member and the second gear and configured to restrain or release the ring member and the second gear.

8 Claims, 8 Drawing Sheets

(56) References Cited

U.S. PATENT DOCUMENTS

| | | | |
|---|---|---|---|
| 7,090,299 B2* | 8/2006 | Lange | B60N 2/2254 297/362 |
| 7,264,566 B2* | 9/2007 | Dill | B60N 2/2252 475/164 |
| 7,278,689 B2* | 10/2007 | Guillouet | B60N 2/2254 297/362 |
| 7,281,765 B2* | 10/2007 | Scholz | B60N 2/2254 475/162 |
| 7,390,061 B2* | 6/2008 | Lange | B60N 2/2252 297/463.1 |
| 7,455,361 B2* | 11/2008 | Stemmer | B60N 2/2254 475/162 |
| 7,461,900 B2* | 12/2008 | Lange | B60N 2/2252 297/367 R |
| 7,513,573 B2* | 4/2009 | Wahls | B60N 2/2254 297/367 R |
| 7,607,737 B2* | 10/2009 | Liebich | B60N 2/2252 297/362 |
| 7,878,593 B2* | 2/2011 | Nae | B60N 2/2252 297/362 |
| 7,878,594 B2* | 2/2011 | Fukuzawa | B60N 2/2254 297/362.12 |
| 7,946,652 B2* | 5/2011 | Stilleke | B60N 2/938 297/367 R |
| 7,950,741 B2* | 5/2011 | Mitsuhashi | B60N 2/2252 297/367 R |
| 8,262,165 B2* | 9/2012 | Mitsuhashi | B60N 2/236 297/367 R |
| 8,360,525 B2* | 1/2013 | Cha | B60N 2/02246 297/362 |
| 8,444,521 B2* | 5/2013 | Krueger | B60N 2/2252 475/162 |
| 8,672,408 B2* | 3/2014 | Legras | B60N 2/2252 297/361.1 |
| 8,746,796 B2* | 6/2014 | Wei | B60N 2/2254 297/362 |
| 8,777,316 B2* | 7/2014 | Shanmugam | B60N 2/206 297/378.12 |
| 9,114,737 B2* | 8/2015 | Stilleke | B60N 2/2252 |
| 9,205,765 B2* | 12/2015 | Kim | B60N 2/2254 |
| 10,532,670 B2* | 1/2020 | Chang | B60N 2/236 |
| 11,407,337 B2* | 8/2022 | Lee | B60N 2/2252 |
| 11,528,992 B2* | 12/2022 | Hur | A47C 1/025 |
| 2004/0195889 A1* | 10/2004 | Secord | B60N 2/224 297/362 |
| 2005/0231017 A1* | 10/2005 | Lange | B60N 2/2252 297/374 |
| 2006/0290187 A1* | 12/2006 | Scholz | B60N 2/2254 297/362 |
| 2006/0290188 A1* | 12/2006 | Guillouet | B60N 2/2252 297/367 R |
| 2008/0136242 A1* | 6/2008 | Stemmer | B60N 2/2254 297/362 |
| 2008/0193203 A1* | 8/2008 | Voss | B60N 2/2254 403/97 |
| 2008/0197686 A1* | 8/2008 | Liebich | B60N 2/2252 297/361.1 |
| 2011/0169312 A1* | 7/2011 | Desquesne | B60N 2/2252 297/362 |
| 2012/0277050 A1* | 11/2012 | Jokiel | B60N 2/2254 475/175 |
| 2013/0009439 A1* | 1/2013 | Jokiel | B60N 2/2254 297/362 |
| 2013/0090204 A1* | 4/2013 | Stilleke | B60N 2/2252 475/159 |
| 2014/0225411 A1* | 8/2014 | Matt | B60N 2/236 297/362 |
| 2015/0054324 A1* | 2/2015 | Chang | B60N 2/2254 297/362 |
| 2016/0059742 A1* | 3/2016 | Sasaki | B60N 2/64 297/354.12 |
| 2016/0200222 A1* | 7/2016 | Desquesne | B60N 2/2254 297/354.12 |
| 2017/0361734 A1* | 12/2017 | Aktas | F16C 33/581 |
| 2021/0162892 A1* | 6/2021 | Lee | B60N 2/02246 |
| 2021/0309130 A1* | 10/2021 | Üstünberk | B60N 2/2254 |
| 2022/0104621 A1* | 4/2022 | Hur | A47C 1/025 |
| 2024/0017648 A1* | 1/2024 | Kim | B60N 2/2252 |
| 2024/0034203 A1* | 2/2024 | Shin | B60N 2/2252 |
| 2024/0051436 A1* | 2/2024 | Kim | B60N 2/2252 |

FOREIGN PATENT DOCUMENTS

| | | | |
|---|---|---|---|
| KR | 2015-0096931 A | 8/2015 | |
| KR | 10-1635354 B1 | 7/2016 | |
| KR | 2021-0026362 A | 3/2021 | |
| KR | 10-2236705 B1 | 4/2021 | |
| WO | WO-2007105643 A1 * | 9/2007 | B60N 2/2252 |

* cited by examiner

RECLINER FOR VEHICLE SEAT

TECHNICAL FIELD

The present invention relates to a recliner for a vehicle seat.

BACKGROUND ART

In general, a recliner may adjust an angle of a seatback in a forward/rearward direction with respect to a seat cushion and provide a high coupling force between components during a reclining operation, thereby ensuring safety of a vehicle occupant. The recliners may be classified into a manual recliner that adjusts an angle of a seatback in response to a lever manipulation, and a powered recliner that may be automatically operated by power of a motor generated in response to a switch manipulation.

Figure 1:
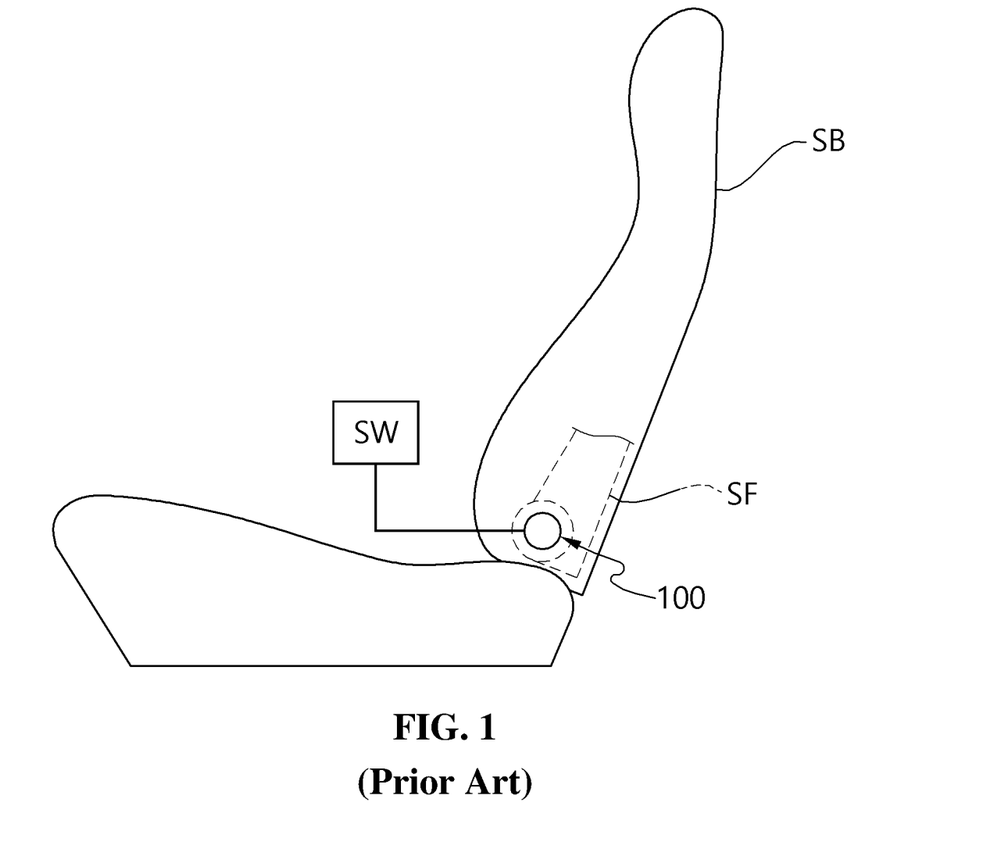
FIG. 1 is a view illustrating a state in which a recliner for a vehicle seat in the related art is mounted on a seatback frame.
Figure 2:
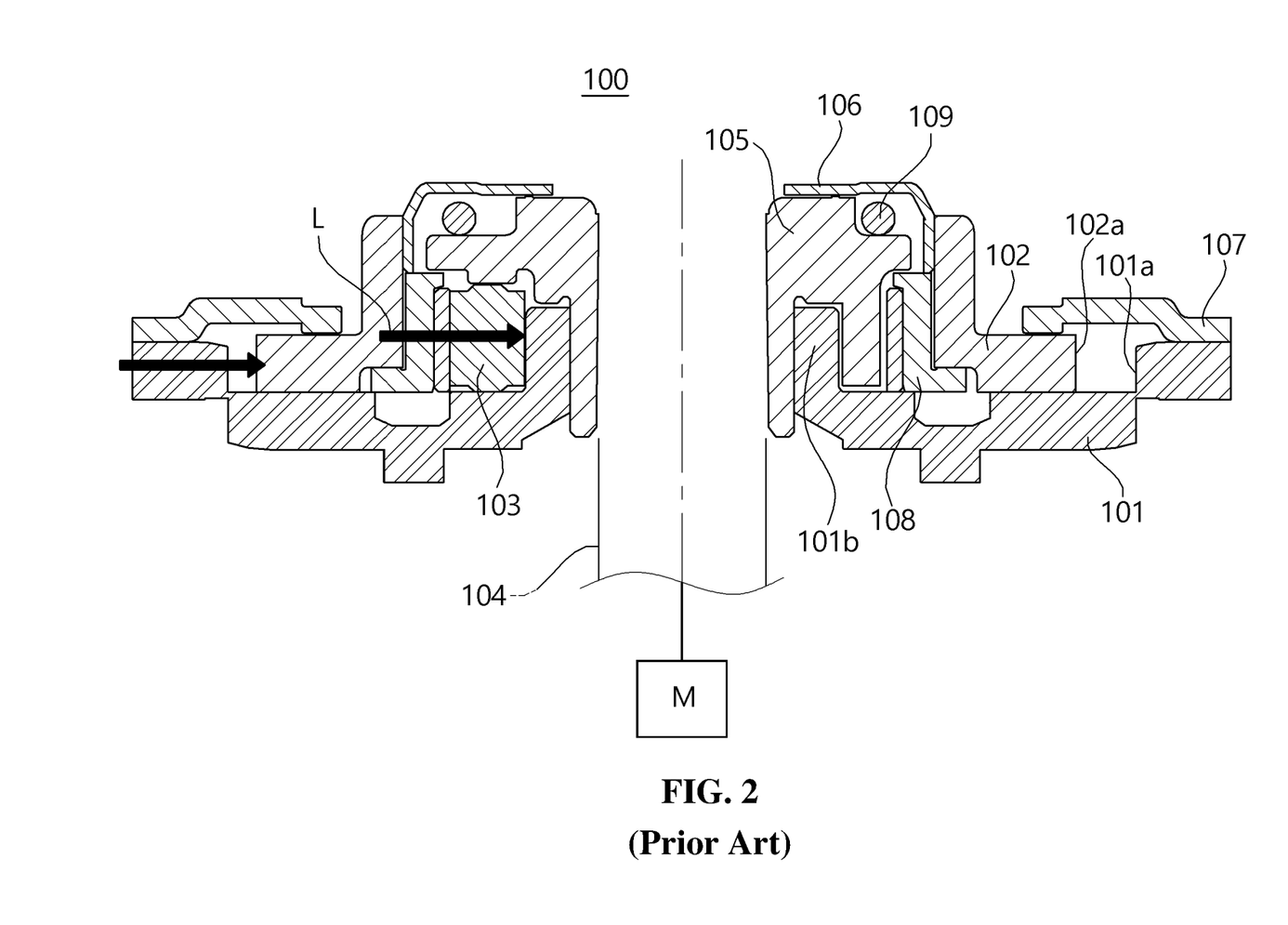
FIG. 2 is a cross-sectional side view of a recliner for a vehicle seat in the related art.
Figure 3:
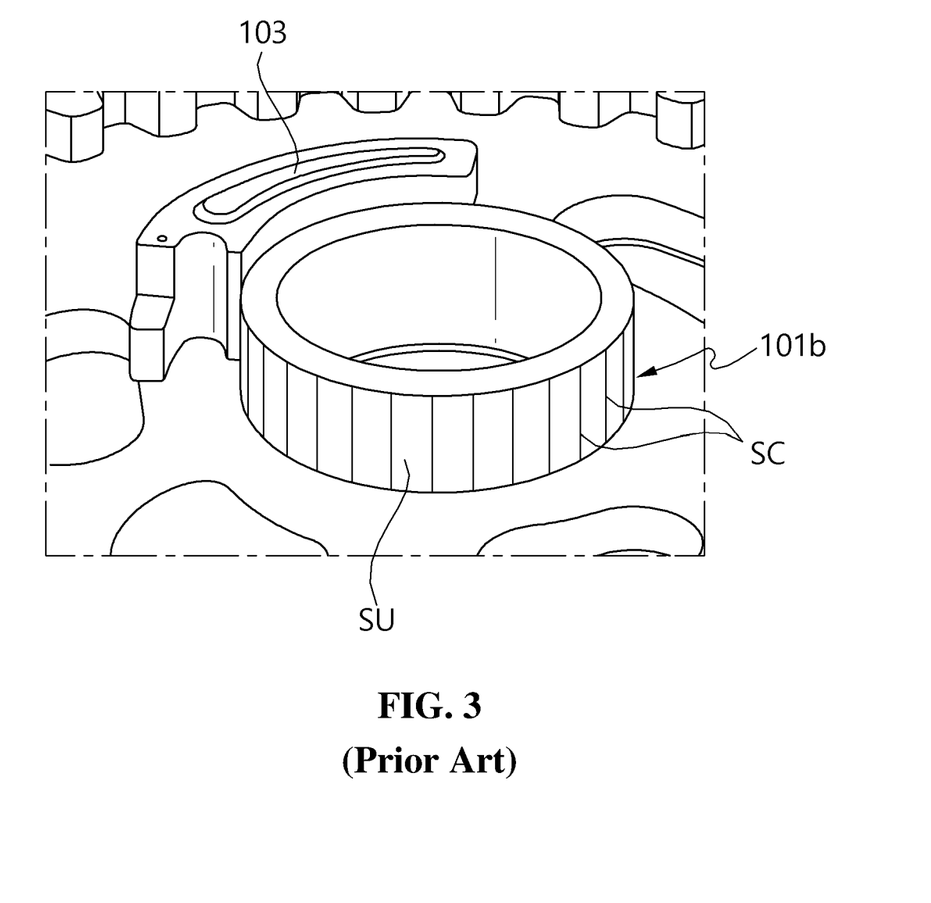
FIG. 3 is a view illustrating a collar part of the recliner for a vehicle seat in the related art.

FIG. 1 is a view illustrating a state in which a recliner for a vehicle seat in the related art is mounted on a seatback frame, FIG. 2 is a cross-sectional side view of a recliner for a vehicle seat in the related art, and FIG. 3 is a view illustrating a collar part of the recliner for a vehicle seat in the related art.

As illustrated in FIG. 1, a recliner 100 may be mounted on a seatback frame SF in a seatback SB. As illustrated in FIGS. 2 and 3, the recliner 100 in the related art includes a first gear 101 having inner teeth 101a, and a second gear 102 having outer teeth 102a that engage with the inner teeth 101a of the first gear 101. An eccentric state of the second gear 102, which is eccentrically coupled in the first gear 101, is maintained by a pair of wedges 103 interposed between a bushing 108 and a collar part 101b of the first gear 101 and elastically supported by a spring 109. Further, a locking state or an unlocking state for an operation of the recliner may be maintained in the same way. The pair of wedges 103 is elastically supported by two opposite ends of the spring 109, and a spread state thereof may be maintained. When a motor M is operated by an operation of a switch SW and a shaft 110 connected to the motor M rotates, the second gear 102 is rotated by a rotation of a socket 105 connected to the shaft 110 and rotations of the wedges 103, and the first gear 101 rotates in conjunction with the rotation of the second gear 102. Therefore, an angle of a seatback frame SF may be adjusted, and an angle of the seatback SB may be adjusted. A cover 106 may be coupled to an inner diameter portion of the second gear 102 so as to surround the spring 109. A guide ring 107 may be coupled to surround an engagement portion where the inner teeth 101a of the first gear 101 and the outer teeth 102a of the second gear 102 engage with one another.

Meanwhile, when an external force is applied to the seatback frame SF, a load L, which is transmitted through an engagement portion TC between the inner teeth 101a of the first gear 101 and the outer teeth 102a of the second gear 102, is concentrated on the collar part 101b of the first gear 101, which causes deformation of the collar part 101b. The deformation of the collar part 101b may cause a deterioration in engagement properties between the second gear 102 and the first gear 101 and cause damage.

In the related art, a thickness of the collar part 101b of the first gear 101 is increased to solve the above-mentioned problem, but there is a limitation in increasing the thickness of the collar part. The collar part 101b, which is produced by a burring or forming process, has a non-uniform surface roughness SU, and scratches SC are inevitably formed in an axial direction of an outer diameter portion. For this reason, friction of the wedges 103, which are in contact with the collar part 101b and rotate, is increased, which adversely affects the operation of the recliner.

DOCUMENT OF RELATED ART

Patent Document (Patent Document 1) Korean Patent No. 10-2236705 (published on Apr. 6, 2021)

SUMMARY OF THE INVENTION

The present invention has been made in an effort to solve the above-mentioned problem, and an object of the present invention is to provide a recliner for a vehicle seat, in which a ring member is coupled to a collar part to disperse a load, which is applied to the collar part, through the ring member.

Another object of the present invention is to provide a recliner for a vehicle seat, in which a first protruding portion is formed on one surface of a ring member and is in contact with a relative assembling surface of a socket, thereby preventing a coating liquid from entering the ring member in an assembled state.

To achieve the above-mentioned objects, the present invention provides a recliner for a vehicle seat, the recliner including: a first gear having a collar part extending from a center of one surface; a second gear configured to eccentrically engage with the first gear while being internally in contact with the first gear; a ring member coupled to surround the collar part; a socket coupled to surround the ring member; and a pair of wedge cams disposed between the ring member and the second gear and configured to restrain or release the ring member and the second gear.

The ring member may include: a first inner diameter portion formed in a direction from one surface to the other surface; and a second inner diameter portion formed in a direction from the other surface to one surface so as to communicate with the first inner diameter portion, the second inner diameter portion having a larger inner diameter than the first inner diameter portion so that a first stepped portion is formed on a boundary between the first inner diameter portion and the second inner diameter portion.

A flange portion may be formed on an outer diameter portion of the ring member, and the flange portion may be coupled to an accommodation groove formed along a periphery of the collar part of the first gear.

The first stepped portion of the ring member may be directed toward an end surface of the collar part.

At least one first protruding portion may be provided on one surface of the ring member, and the first protruding portion may be in contact with a relative assembling surface of the socket.

At least one second protruding portion may be provided on the relative assembling surface of the socket, and the second protruding portion may be positioned between the plurality of first protruding portions.

The ring member may be produced by sintering.

An outer diameter portion of the ring member may be polished.

The socket may include: a first coupling portion extending from a center and coupled to the first inner diameter portion of the ring member; and a second coupling portion extending from the first coupling portion and coupled to an inner diameter portion of the collar part, the second coupling portion having a smaller outer diameter than the first coupling portion so that a second stepped portion is formed on a boundary between the first coupling portion and the second coupling portion.

The second stepped portion may define a plane together with the first stepped portion of the ring member, and an end surface of the collar part may be in contact with the second stepped portion.

According to the present invention, the collar part may be coupled to the ring member, which makes it possible to prevent the deformation of the collar part by dispersing a load, which is applied to the collar part, through the ring member.

According to the present invention, the dispersion of the load may ensure the engagement performance of the first gear and the second gear.

According to the present invention, the first protruding portion of the ring member, which is in contact with the relative assembling surface of the socket, may prevent a coating liquid from being introduced into the ring member.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 4:
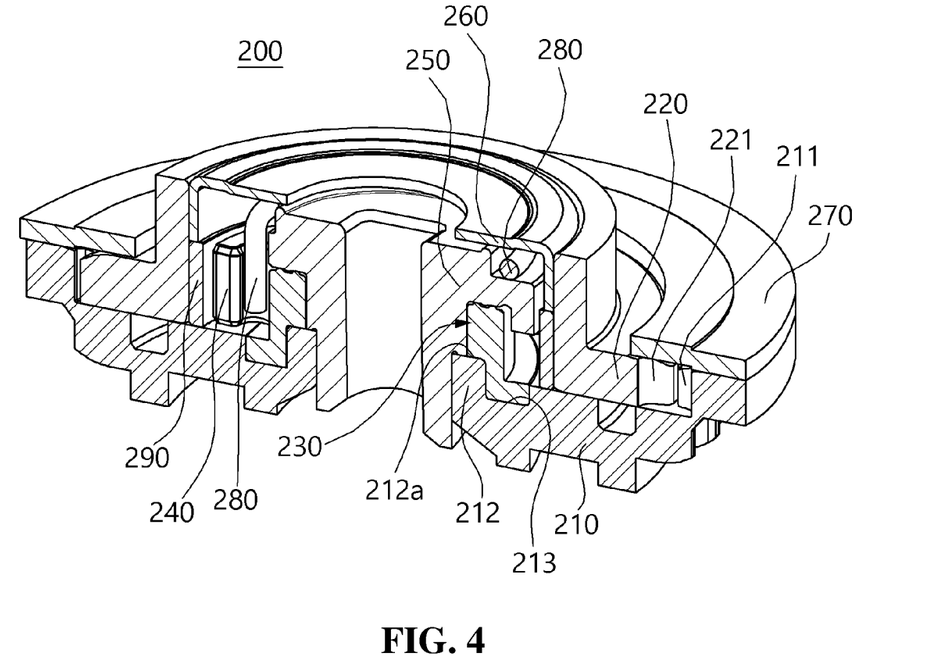
FIG. 4 is a perspective view of a recliner for a vehicle seat according to an exemplary embodiment of the present invention.

FIG. 4 is a perspective view of a recliner for a vehicle seat according to an exemplary embodiment of the present invention.

As illustrated in FIG. 4, a recliner 200 for a vehicle seat of the present invention includes a first gear 210 having a collar part 212 extending from a center of one surface, a second gear 220 being internally in contact with the first gear 210, a ring member 230 coupled to the collar part 212, a socket 250 coupled to the ring member 230, and a pair of wedge cams 240 positioned between the ring member 230 and the second gear 220 and elastically supported by an elastic member 280. For example, the elastic member 280 may be a spring.

A coupling member 290 may be coupled to an inner diameter portion of the second gear 220. The coupling member 290 may be positioned between the inner diameter portion of the second gear 220 and the wedge cam 240. For example, the coupling member 290 may be a bushing, a bearing, or the like.

Two opposite ends of the elastic member 280, which are bent and extend, push upper ends of the pair of two opposite wedge cams 240 in a direction in which the wedge cams 240 move away from each other. The elastic member 280 may be coupled to the socket 250. The elastic member 280 may be positioned between a first cover 260 and the socket 250.

Figure 5:
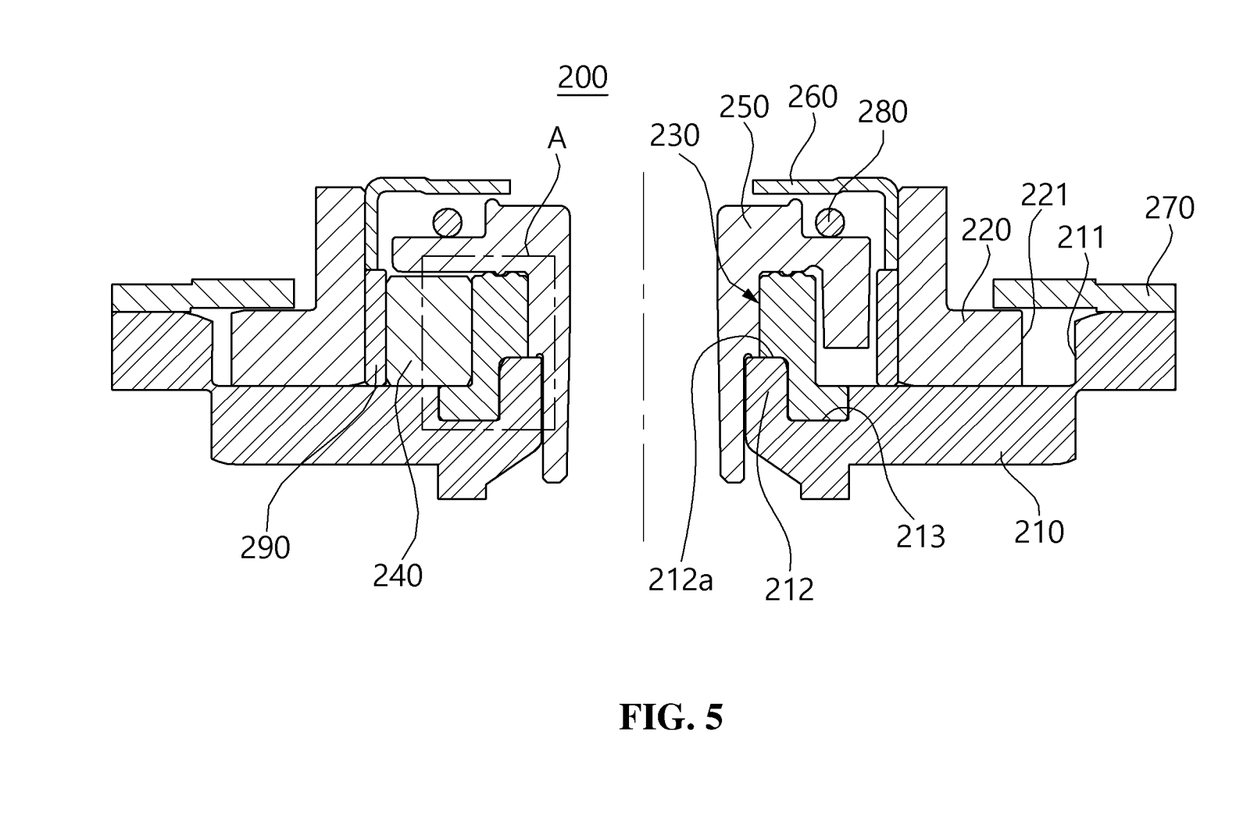
FIG. 5 is a cross-sectional side view of the recliner for a vehicle seat according to the exemplary embodiment of the present invention.
Figure 6:
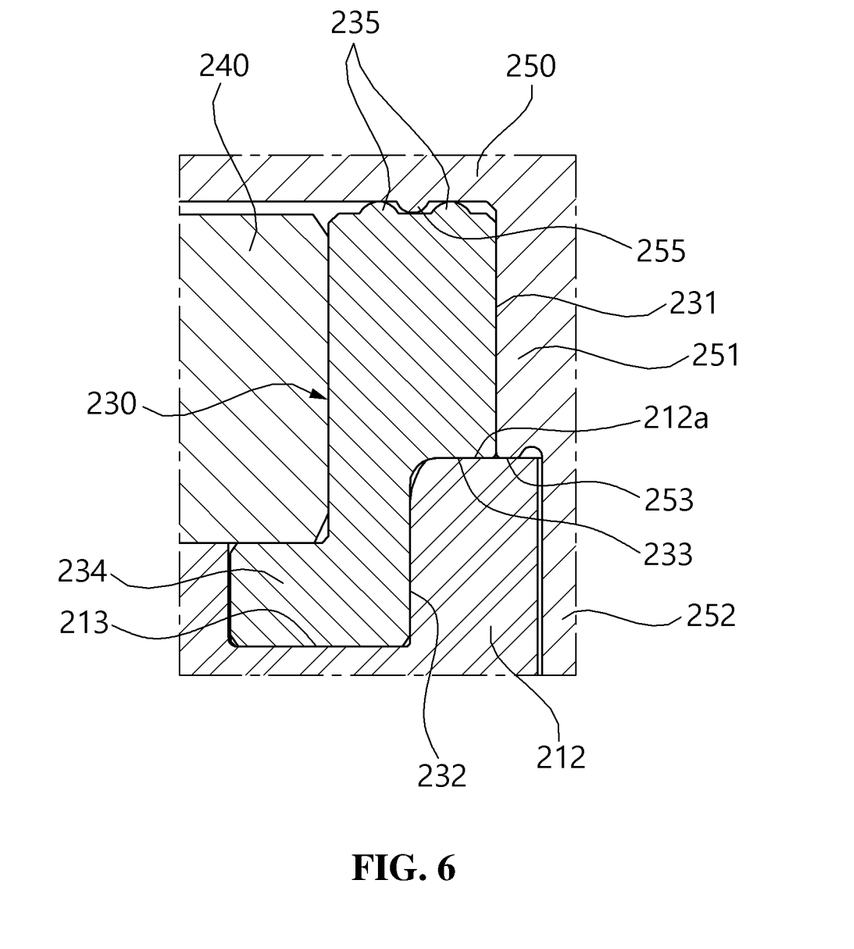
FIG. 6 is an enlarged view of part A in FIG. 5.

FIG. 5 is a cross-sectional side view of the recliner for a vehicle seat according to the exemplary embodiment of the present invention, and FIG. 6 is an enlarged view of part A in FIG. 5.

As illustrated in FIGS. 5 and 6, the first gear 210 may have inner teeth 211 provided on an inner diameter portion thereof. The inner teeth 211 may engage with the second gear 220. An accommodation groove 213 may be formed along a periphery of the collar part 212 of the first gear 210.

The second gear 220 may have a smaller outer diameter than the first gear 210. The second gear 220 may eccentrically engage with the first gear 210. The second gear 220 has outer teeth 221 provided on an outer diameter portion thereof. The outer teeth 221 of the second gear 220 may engage with the inner teeth 211 of the first gear 210.

The wedge cam 240 may have an arc shape. The wedge cam 240 may have a width that gradually increases toward one end thereof. The pair of wedge cams 240 may be coupled between the ring member 230 and the second gear 220. The pair of wedge cams 240 may restrain or release the ring member 230 and the second gear 220.

The ring member 230 is coupled to surround the collar part 212. The ring member 230 includes a first inner diameter portion 231 and a second inner diameter portion 232.

The first inner diameter portion 231 may be formed through one surface of the ring member 230 and the other surface thereof directed toward the collar part 212.

The second inner diameter portion 232 communicates with the first inner diameter portion 231. The second inner diameter portion 232 is formed in a direction from the other surface to one surface. The second inner diameter portion 232 may have a larger inner diameter than the first inner diameter portion 231.

Because the second inner diameter portion 232 has a larger inner diameter than the first inner diameter portion 231, a first stepped portion 233 may be formed on a boundary between the first inner diameter portion 231 and the second inner diameter portion 232. The first stepped portion 233 may be assembled to be directed toward an end surface 212a of the collar part 212.

A flange portion 234 may be formed on an outer diameter portion of the ring member 230. The flange portion 234 may be formed in a shape that conforms to the accommodation groove 213 of the first gear 210. The flange portion 234 may be coupled to the accommodation groove 213 of the first gear 210.

At least one first protruding portion 235 may be provided on one surface of the ring member 230. The first protruding portion 235 may have an annular shape. The first protruding portion 235 may be provided as a plurality of first protruding portions 235 while defining concentric circles on one surface, thereby defining a concave-convex surface. The first protruding portion 235 may protrude and be assembled to be in contact with a relative assembling surface of the socket 250.

The first protruding portion 235 may be in contact with the relative assembling surface of the socket 250 to define a leakproof structure together with the relative assembling surface of the socket 250, thereby preventing outside foreign substances or a coating liquid from penetrating into the recliner.

The socket 250 is coupled to surround the ring member 230. The wedge cam 240 may rotate when the socket 250 rotates. An inner diameter portion of the socket 250 may have an angular structure such as a quadrangular structure. A shaft (not illustrated) for transmitting power may be coupled to the inner diameter portion of the socket 250. The shaft may be connected to a motor (not illustrated).

At least one second protruding portion 255, which protrudes toward the ring member 230, may be provided on the relative assembling surface of the socket 250 with which the first protruding portion 235 is in contact. The second protruding portion 255 may be assembled to be positioned between the plurality of first protruding portions 235 provided on one surface of the ring member 230.

The structures, such as the first protruding portion 235 and the second protruding portion 255, may perfectly prevent the penetration of outside foreign substances or the coating liquid.

The socket 250 includes a first coupling portion 251 and a second coupling portion 252. The first coupling portion 251 may extend in a direction from a center toward the collar part 212. The first coupling portion 251 may be coupled to the first inner diameter portion 231 of the ring member 230. The second coupling portion 252 may extend from the first coupling portion 251. The second coupling portion 252 may be coupled to an inner diameter portion of the collar part 212.

The second coupling portion 252 may have a smaller outer diameter than the first coupling portion 251. Because the second coupling portion 252 has a smaller outer diameter than the first coupling portion 251, a second stepped portion 253 may be formed on a boundary between the first coupling portion 251 and the second coupling portion 252.

The second stepped portion 253 may be assembled to define a plane together with the first stepped portion 233 of the ring member 230. The second stepped portion 253 may be assembled to be in contact with the end surface 212a of the collar part 212.

The first cover 260 may be coupled to the inner diameter portion of the second gear 220. The first cover 260 may prevent the separation of the wedge cam 240, the socket 250, the elastic member 280, and the like that are coupled in the second gear 220. For example, the first cover 260 may be coupled to the inner diameter portion of the second gear 220 by welding.

A second cover 270 may be coupled to an outer diameter portion of the first gear 210. The second cover 270 may be coupled to surround an engagement portion between the inner teeth 211 of the first gear 210 and the outer teeth 221 of the second gear 220, thereby preventing the second gear 220 from separating from the first gear 210.

Figure 7:
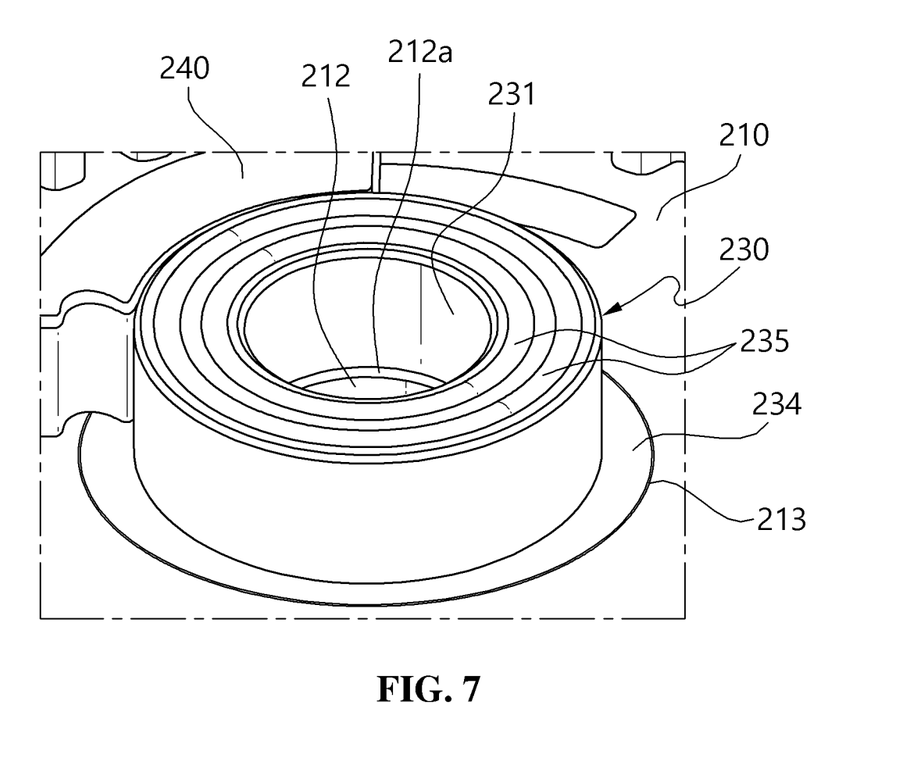
FIG. 7 is an enlarged view of a ring member according to the exemplary embodiment of the present invention.

FIG. 7 is an enlarged view of the ring member according to the exemplary embodiment of the present invention.

As illustrated in FIG. 7, the ring member 230 may be configured as a component provided separately from the collar part 212. The ring member 230 may be produced by sintering.

An outer diameter portion of the ring member 230, which is produced by sintering, is polished to remove scratches on the outer diameter portion and optimize surface roughness, such that friction of the wedge cam 240, which is in contact with the ring member 230, may be minimized, thereby allowing the wedge cam 240 to operate smoothly.

Next, a load applied to the collar part of the present invention will be described.

Figure 8:
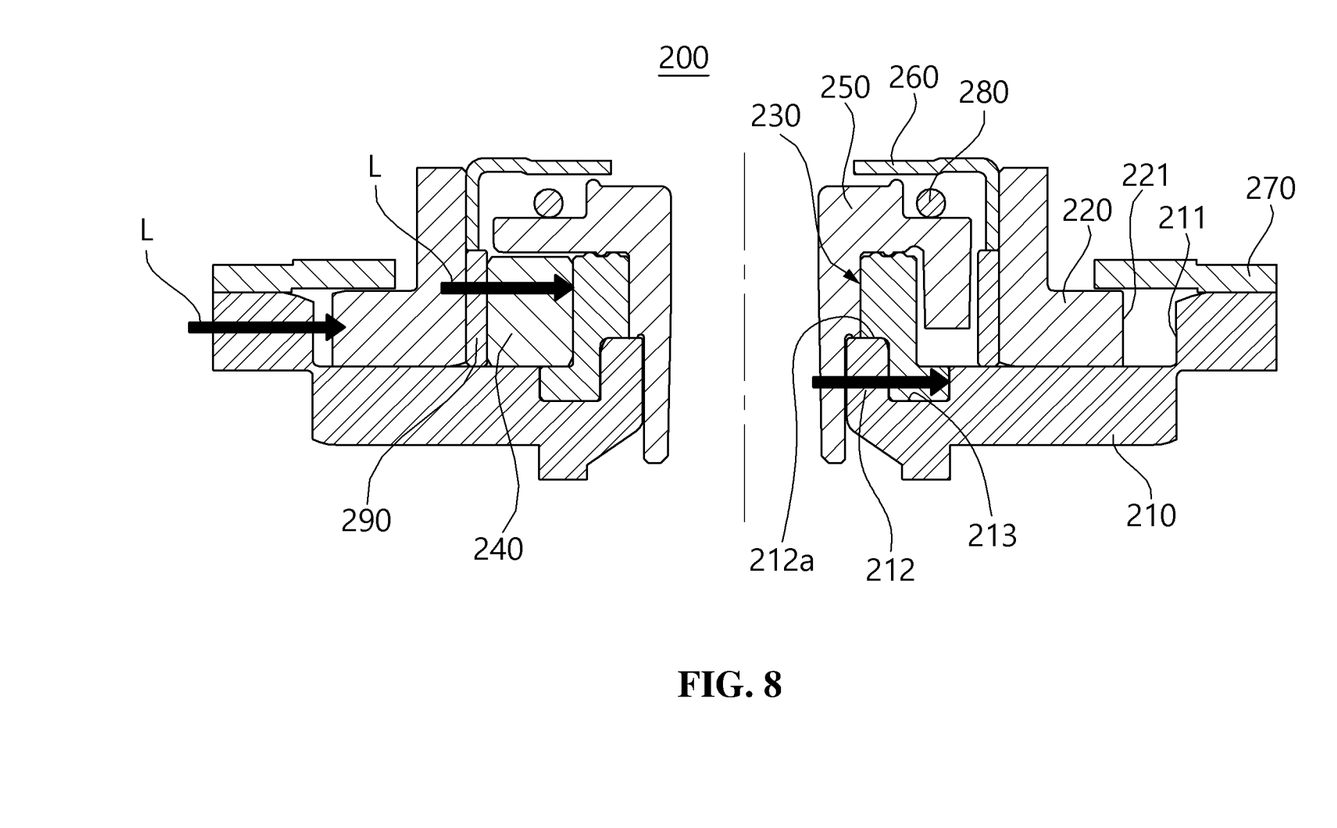
FIG. 8 is a view illustrating a load applied to a collar part of the recliner for a vehicle seat according to the exemplary embodiment of the present invention.

FIG. 8 is a view illustrating a load applied to the collar part of the recliner for a vehicle seat according to the exemplary embodiment of the present invention.

In the related art, when an external force is applied to a seatback frame, a load, which is transmitted through an engagement portion between inner teeth of a first gear and outer teeth of a second gear, is concentrated on a collar part of the first gear, which causes deformation of the collar part. The deformation of the collar part causes a deterioration in engagement properties between the second gear and the first gear and causes damage.

However, the present invention may obtain an effect of increasing a thickness of the collar part by coupling the ring member to the collar part without increasing the thickness of the collar part itself.

As illustrated in FIG. 8, in the recliner 200 for a vehicle seat of the present invention, a load L, which is applied to the collar part 212 through the engagement portion between the inner teeth 211 of the first gear 210 and the outer teeth 221 of the second gear 220, may be dispersed from the ring member 230 without being applied directly to the collar part 212, thereby preventing the deformation of the collar part 212.

In addition, the ring member 230 may reinforce the collar part 212 and disperse a load, thereby ensuring engagement performance of the first gear 210 and the second gear 220.

Meanwhile, according to the present invention, the first protruding portion 235 of the ring member 230, which is in contact with the relative assembling surface of the socket 250, may define the leakproof structure on the assembled portion between the socket 250 and the ring member 230, which makes it possible to prevent outside foreign substances or the coating liquid from penetrating into the ring member 230 and allow the socket 250 and the ring member 230 to operate smoothly.

In the related art, because the collar part 212 is manufactured by burring or forming, the outer diameter portion of the collar part 212 is scratched, and non-uniform surface roughness is caused. Further, because the collar part 212 is integrated with the first gear 210, it is not easy to process the outer diameter portion of the collar part 212.

However, according to the present invention, because the ring member 230 and the collar part 212 are separately provided, the outer diameter portion of the collar part 212, which is produced by sintering, is easily polished by a post-process such as barreling. The surface roughness of the outer diameter portion of the collar part 212 may be optimized and scratches may be perfectly removed by polishing the outer diameter portion of the collar part 212. The friction of the wedge cam 240, which operates while being in contact with the collar part 212, may be minimized by polishing the outer diameter portion of the collar part 212, thereby allowing the wedge cam 240 to operate smoothly.

Next, a process of adjusting an angle of the seatback of the present invention will be described.

As illustrated in FIG. 8, the motor (not illustrated) is operated by an operation of a switch (not illustrated), and the shaft (not illustrated) connected to the motor rotates.

The wedge cam 240 and the socket 250 connected to the shaft may be rotated by the rotation of the shaft. The second gear 220 may be rotated by the rotations of the socket 250 and the wedge cam 240.

The first gear 210 rotates in conjunction with the rotation of the second gear 220. As the first gear 210 rotates, an angle of the seatback frame (not illustrated) may be adjusted, such that an angle of the seatback (not illustrated) may be adjusted.

The present invention may be applied to a powered recliner configured to be automatically operated by power of a motor in response to a switch manipulation.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A recliner for a vehicle seat, the recliner comprising:
   a first gear having a collar part extending from a center of one surface of the first gear;
   a second gear configured to eccentrically engage with the first gear while being in contact with an inner portion of the first gear;
   a ring member coupled to the collar part;
   a socket coupled to the ring member; and
   a pair of wedge cams disposed between the ring member and the second gear and configured to restrain or release the ring member and the second gear,
   wherein the ring member comprises:
   a first inner diameter portion defined in a direction from a first surface of the ring member to a second surface of the ring member; and
   a second inner diameter portion defined in a direction from the second surface of the ring member to the first surface of the ring member, the second inner diameter portion having a larger inner diameter than the first inner diameter portion so that a first stepped portion is defined on a boundary between the first inner diameter portion and the second inner diameter portion.

2. The recliner of claim 1, wherein a flange portion is defined on an outer diameter portion of the ring member, and the flange portion is coupled to an accommodation groove defined along a periphery of the collar part of the first gear.

3. The recliner of claim 1, wherein the first stepped portion of the ring member is directed toward an end surface of the collar part.

4. The recliner of claim 1, wherein the ring member is a sintered ring.

5. The recliner of claim 4, wherein an outer diameter portion of the ring member is polished.

6. The recliner of claim 1,
   wherein the socket comprises:
   a first coupling portion extending from a center of the socket and coupled to the first inner diameter portion of the ring member; and
   a second coupling portion extending from the first coupling portion and coupled to an inner diameter portion of the collar part, the second coupling portion having a smaller outer diameter than the first coupling portion so that a second stepped portion is defined on a boundary between the first coupling portion and the second coupling portion.

7. The recliner of claim 6, wherein the second stepped portion defines a plane together with the first stepped portion of the ring member, and an end surface of the collar part is in contact with the second stepped portion.

8. A recliner for a vehicle seat, the recliner comprising:
   a first gear having a collar part extending from a center of one surface of the first gear;
   a second gear configured to eccentrically engage with the first gear while being in contact with an inner portion of the first gear;
   a ring member coupled to the collar part;
   a socket coupled to the ring member; and
   a pair of wedge cams disposed between the ring member and the second gear and configured to restrain or release the ring member and the second gear,
   wherein at least one first protruding portion is disposed on one surface of the ring member, and the at least one first protruding portion is in contact with a relative assembling surface of the socket,
wherein the at least one first protruding portion includes a plurality of first protruding portions, at least one second protruding portion is disposed on the relative assembling surface of the socket, and the at least one second protruding portion is positioned between the plurality of first protruding portions.

\* \* \* \* \*